(12) United States Patent
Herges

(10) Patent No.: US 7,681,959 B2
(45) Date of Patent: Mar. 23, 2010

(54) METHOD FOR BRAKE PRESSURE DISTRIBUTION BETWEEN THE AXLES OF A VEHICLE

(75) Inventor: Michael Herges, Budapest (HU)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/365,042

(22) Filed: Feb. 3, 2009

(65) Prior Publication Data

US 2009/0134698 A1    May 28, 2009

Related U.S. Application Data

(63) Continuation of application No. PCT/EP2007/006852, filed on Aug. 2, 2007.

(30) Foreign Application Priority Data

Aug. 3, 2006    (DE) .................. 10 2006 036 280

(51) Int. Cl.
*B60T 8/1766* (2006.01)
(52) U.S. Cl. .................. 303/9.71; 303/186; 303/DIG. 6
(58) Field of Classification Search ............ 303/9.62, 303/9.71, 186, DIG. 6, 187
See application file for complete search history.

(56) References Cited

U.S. PATENT DOCUMENTS 4,606,586 A * 8/1986 Eckert et al. ............... 303/155

| | | | | |
|---|---|---|---|---|
| 5,011,236 A | * | 4/1991 | Toepfer et al. | ............... 303/198 |
| 5,163,742 A | * | 11/1992 | Topfer et al. | ................ 303/155 |
| 5,386,366 A | | 1/1995 | Roll et al. | |
| 6,428,118 B1 | | 8/2002 | Blosch | |

FOREIGN PATENT DOCUMENTS

| DE | 27 55 156 A1 | 6/1979 |
|---|---|---|
| DE | 40 07 360 A1 | 9/1991 |
| DE | 198 44 540 A1 | 3/2000 |
| DE | 101 56 773 A1 | 6/2003 |
| EP | 0 537 724 B1 | 4/1993 |
| EP | 0 550 849 A1 | 7/1993 |
| EP | 1 466 800 A1 | 10/2004 |

OTHER PUBLICATIONS

International Search Report dated Dec. 4, 2007 including English translation (Four (4) pages).

* cited by examiner

*Primary Examiner*—Thomas J Williams
(74) *Attorney, Agent, or Firm*—Crowell & Moring LLP

(57) ABSTRACT

A brake pressure distribution between axles is regulated as a function of a difference in wheel rotational speeds between axles or wheel slip values between axles at the axles. Exceeding a predefined limit value in difference in the wheel rotational speed between axles or the wheel slip values between axles during braking serves to regulate the distribution. On the basis of the dependency between at least the brake pressure at the rear axle and the vehicle deceleration after at least two preceding service braking operations, a critical deceleration value is determined.

10 Claims, 2 Drawing Sheets

METHOD FOR BRAKE PRESSURE DISTRIBUTION BETWEEN THE AXLES OF A VEHICLE

CROSS-REFERENCE TO RELATED APPLICATIONS

This application is a continuation of PCT International Application No. PCT/EP2007/006852, filed Aug. 2, 2007, which claims priority under 35 U.S.C. §119 to German Patent Application No. DE 10 2006 036 280.2, filed Aug. 3, 2006, the entire disclosures of which are herein expressly incorporated by reference.

BACKGROUND AND SUMMARY OF THE INVENTION

The invention is based on a method for brake pressure distribution between the axles of a vehicle with a pressure medium brake. The vehicle includes rotational speed sensors which are assigned to brakeable wheels and serve as actual value sensors. The brake pressure distribution between the axles is controlled in accordance with a difference in wheel speeds between the axles or in wheel slip values between the axles at the axles. The upward exceedance of a predefined limiting value by the difference in wheel speeds between the axles or the wheel slip values between the axles during a braking operation is used to control the brake pressure distribution.

When braking, changes in dynamic axle load occur owing to the deceleration of the mass of the vehicle. In the process, the front axle is additionally loaded and the rear axle is relieved of loading with the same ratio. In short vehicles with a center of gravity which is high and/or far forward, i.e. if an unfavorable ratio of the height of the center of gravity with respect to the wheel base is present, as is the case, for example, in the field of utility or commercial vehicles in the solo operating mode of tractor vehicles of a traction vehicle/semitrailer combination, this can lead, on the one hand, to the vehicle tilting over forward, i.e., to the vehicle performing a headstand. On the other hand, the lateral guidance of the rear wheels decreases, which is critical, in particular, during a braking process around a curver or bend in the road.

In order to counteract these problems, for example, DE 27 55 156 A discloses a load-dependent braking force limiter. The braking force limiter becomes active during relatively strong braking operations in which, owing to the changes in axle load which occur, the rear axle would lock. The braking force limiter prevents a further rise in the pressure from a set value, at least in the rear axle brake cylinders. Since the load is measured but not the height of the center of gravity which is essential for the critical tendency to tilt and the relieving of loading of the rear axle, this method is too imprecise. Furthermore, permanently programmed limiting values or else axle-load-dependent characteristic curves for the brake pressure always relate to utility vehicles with certain equipment and a certain vehicle body. However, if these parameters are changed, for example, in the course of retrofitting of the utility vehicle, the defined pressure limiting values or axle-load dependent characteristic curves no longer correspond to the current conditions.

In order to improve the braking stability, DE 40 07 360 A1 discloses a generic differential slip control system in which the brake pressure distribution between the axles is controlled in accordance with an obtained difference in wheel speeds between the axles at the axles, and the upward transgression of a predefined limiting value by the obtained difference in wheel speeds between the axles during a braking operation is used to control the brake pressure distribution.

The present invention is based on the object of developing a method such that a criterion for unstable driving states and braking states is acquired in the simplest possible way, as a basis for suitable counter measures.

According to the invention, in a differential slip control system, a critical deceleration value at which the brake pressure at the rear axle is lower than a predefined brake pressure limiting value is acquired by extrapolation or by interpolation on the basis of the dependence between at least the brake pressure at the rear axle and the deceleration of the vehicle after at least two preceding braking operations.

In such a differential slip control system in which the differential slip between the front axle and the rear axle is, for example, adjusted to zero, approximately linear characteristic curves, for example the characteristic curve for the brake pressure p at the front axle VA and the brake pressure p at the rear axle HA as shown in FIG. 1 are obtained for the brake pressures p as a function of the deceleration z. Since the two characteristic curves are straight lines, to acquire the profile of these straight lines it is sufficient to acquire two reference points composed of, in each case, one deceleration value z and one brake pressure value p which is assigned thereto and to acquire the further values of the linear brake pressure deceleration relationship by interpolation or by extrapolation. The method has the advantage that with each braking operation more of such reference points are acquired and the profile of the characteristic curve for the brake pressure/deceleration can, as a result, be determined even more precisely.

In order to acquire the critical deceleration value at which the rear axle is relieved of loading in such a way that an unstable driving state would arise, that is to say at the point where, according to the differential slip control system, the brake pressure at the rear axle would have to be lower than a predefined brake pressure limiting value, the point of intersection of the straight lines which represent the brake pressure profile at the rear axle with a horizontal line which represents this brake pressure limiting value is determined. The value of the deceleration z at this point of intersection is then the critical deceleration value.

If the brake pressure limiting value at the rear axle is, for example, equal to zero, that is to say according to the differential pressure control system brake pressure should no longer be applied to the brake cylinders of the rear axle owing to relieving of loading on the rear axle during braking, the point of intersection with the axis on which the deceleration z is plotted is determined in the characteristic curve.

Alternatively, for example, the application pressure or release pressure of the brake calipers or brake linings against or from a brake disk or brake drum of the rear axle brake can also be used as a brake pressure limiting value. This is because the application or release brake pressure is very low and is just sufficient still to generate no braking force or a very low braking force. As a result, the braking forces at the rear wheels can be set in accordance with the brake pressure limiting value as a function of the loading and the height of the center of gravity in such a way that the highest possible degree of braking is achieved on the premise that there is lateral guidance of the rear wheels which is sufficient for a stable driving behavior.

In order to avoid unstable driving states and braking states, the maximum deceleration of the vehicle can then be limited, for example, to a value which is smaller than the critical deceleration value.

Alternatively, the brake pressure at the rear axle could be set to smaller values than those predefined after the differential slip control process even before the maximum deceleration has been reached. This has the advantage that the lateral guidance of the rear axle is improved further. Since the front axle is still far from its locking limit owing to the high dynamic axle load displacement, this leads to a more neutral driving behavior.

The method is defined by its high level of simplicity, and consequently only rotational speed sensors, which are present in any case within the scope of antilock systems, and a brake control device, which is likewise present in any case, are necessary in which the routines of the differential slip control process proceed.

Other objects, advantages and novel features of the present invention will become apparent from the following detailed description of one or more preferred embodiments when considered in conjunction with the accompanying drawings.

DETAILED DESCRIPTION OF THE DRAWINGS

The basis of the method for brake pressure distribution between the axles of a utility vehicle with a pressure medium brake forms a differential slip control system.

Such a differential slip control system, which is known per se, includes rotational speed sensors, which are assigned to brakeable wheels and serve as actual value sensors, wherein the brake force distribution between axles is controlled in accordance with a difference in wheel speeds between the axles at the axles or in a difference in wheel slip values between the axles, and the exceeding of a predefined limiting value by the difference in wheel speeds between the axles or wheel slip values between the axles during a braking operation is used to control the brake pressure distribution. Methods for differential slip control are sufficiently known, for example, from DE 40 07 360 A1. For this reason, further details will not be provided here.

In the method according to the invention, a critical deceleration value $z_{abheb}$, at which at least the brake pressure p at the rear axle HA is lower than a predefined brake pressure limiting value, is acquired by extrapolation or by interpolation within the scope of a differential slip control system on the basis of the dependence between the brake pressure p at the rear axle and the deceleration z of the vehicle after at least two preceding service braking operations.

Figure 1:
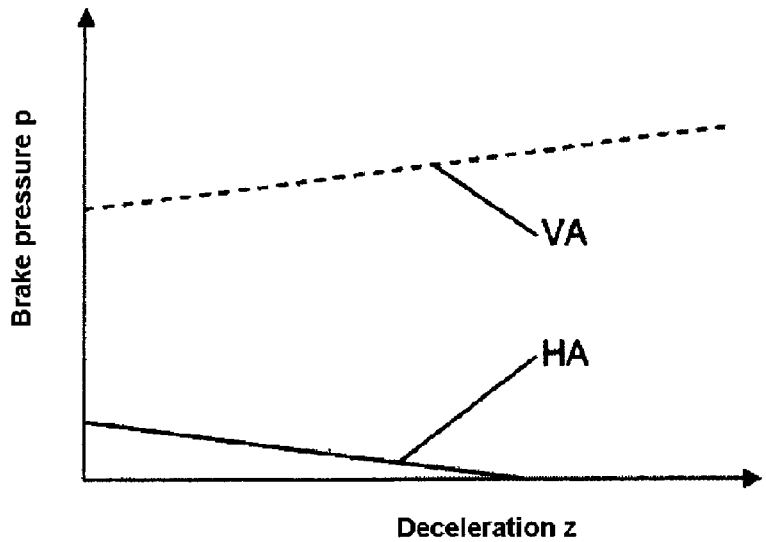
FIG. 1 shows a characteristic curve for brake pressures p as a function of the deceleration z, which is obtained from a differential control process.
Figure 2:
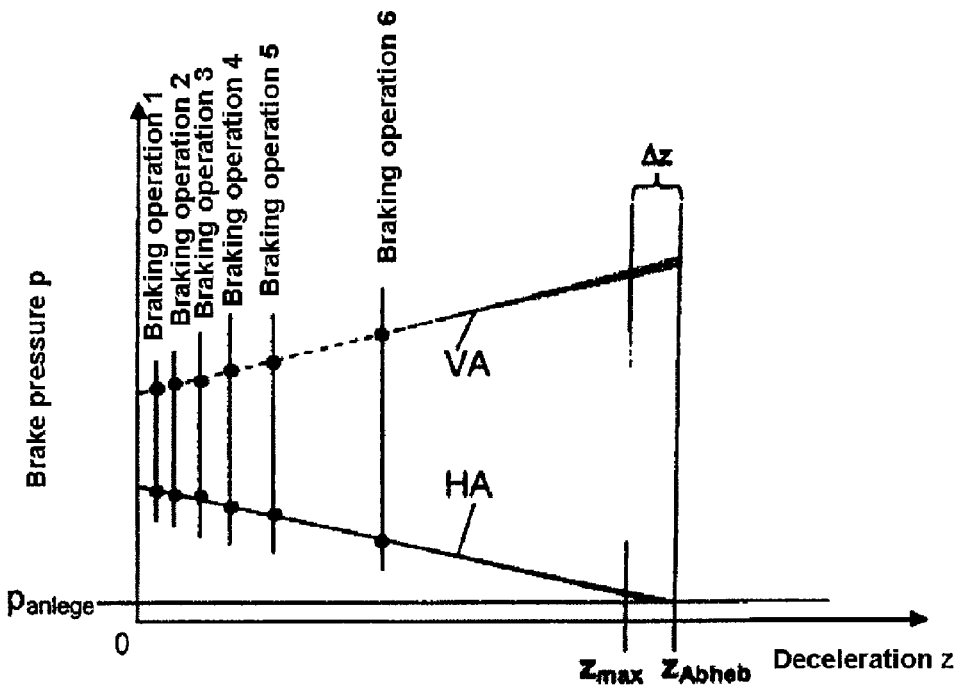
FIG. 2 shows a further characteristic curve for brake pressures p as a function of the deceleration z on the basis of which the critical deceleration value is acquired.

In such a differential slip control process in which the slip at the front axle VA and at the rear axle HA is preferably of equal magnitude and therefore the differential slip between the front axle VA and rear axle HA is adjusted, for example, to zero, approximately linear characteristic curves for the brake pressure p at the front axle VA and the brake pressure p at the rear axle HA are obtained for the brake pressures p as a function of the deceleration z, as is shown in FIG. 2. In this context, after the differential slip control process the brake pressure p decreases linearly at the rear axle HA as the deceleration z increases because the rear axle HA, which is relieved of loading, is otherwise overbraked and can no longer take up lateral guidance forces.

Since the two characteristic curves are straight lines, to acquire the profile of these straight lines it is sufficient to acquire two reference points from two braking operations, for example in FIG. 2 braking operation 1 and braking operation 2, each composed of a deceleration value z1, z2 and a brake pressure value p1, p2 assigned to the latter, and to acquire the further values of the linear brake pressure deceleration relationship by interpolation or by extrapolation. The greater the degree to which a critical event such as, for example, cornering with strong braking, is preceded by braking operations such as, for example, braking operation 1 to braking operation 6, the more reference points are obtained for the two straight lines. Two service braking operations, for example braking operation 1 with low deceleration and braking operation 4 with, by comparison, significantly higher deceleration, and the further values of the linear brake pressure deceleration relationship at relatively high decelerations z are particularly preferably acquired by extrapolation.

In order to acquire the critical deceleration value $z_{abheb}$ at which the rear axle is relieved of loading in such a way that an unstable driving state would arise or the rear axle lifts off from the roadway, that is to say at the point where, according to the differential slip control process the brake pressure at the rear axle would have to be lower than a predefined brake pressure limiting value, the point of intersection of the straight lines which represent the brake pressure profile at the rear axle HA with a horizontal line which represents this brake pressure limiting value is determined. The value of the deceleration at this point of intersection is then the critical deceleration value $z_{abheb}$.

If the brake pressure limiting value is, for example, equal to zero, that is to say according to the differential pressure control system brake pressure should no longer be applied to the brake cylinders of the rear axle owing to relieving of loading on the rear axle during braking, for example the point of intersection with a horizontal axis which represents the brake pressure zero, and correspondingly corresponds to the axis on which the deceleration z is plotted, is determined in the characteristic curve.

Alternatively, for example, the application pressure Panlega or release pressure of the brake calipers or brake linings against or from a brake disk or brake drum of the rear axle brake can also be used as a brake pressure limiting value, as is the case in FIG. 2. This is because this application pressure Panlega is very low and is just sufficient to still generate no braking force or a very low braking force.

Figure 3:
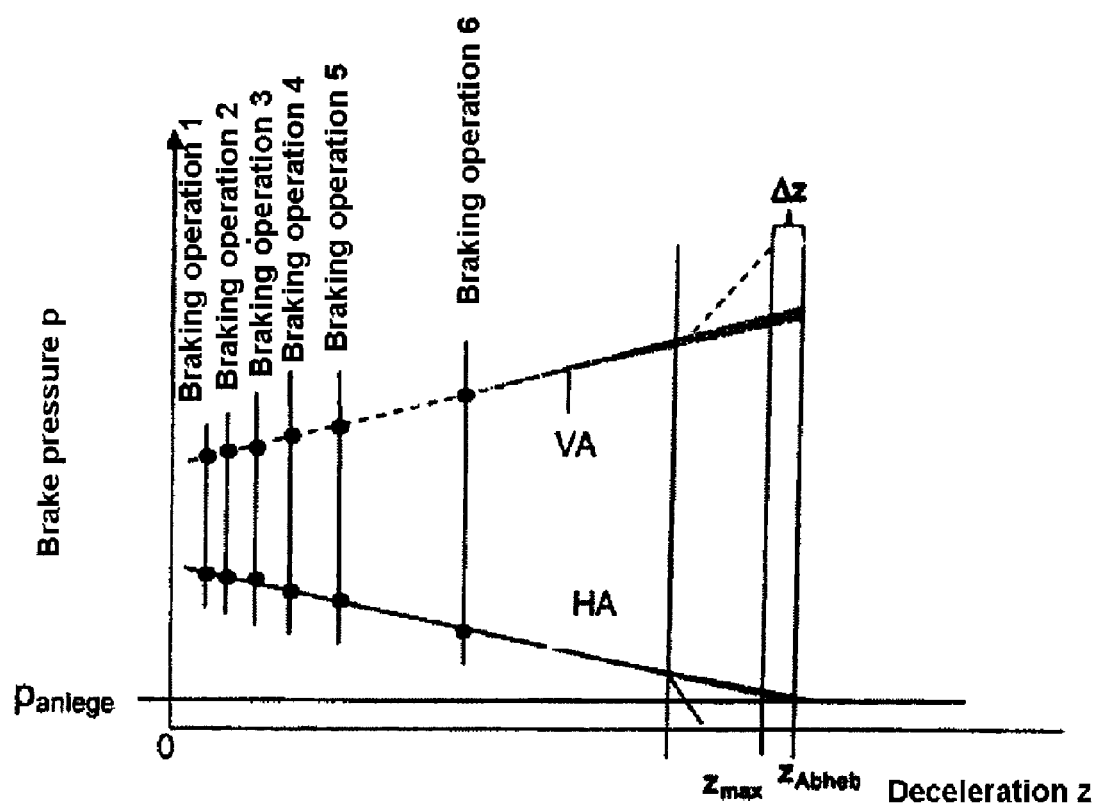
FIG. 3 shows a further characteristic curve for brake pressures p as a function of the deceleration z at which, compared to the characteristic curve in FIG. 2, the rear axle brake pressure drops prematurely and the front axle pressure is increased.

In order to avoid unstable driving states and braking states, it is then possible, as a consequence, to limit the maximum deceleration $z_{max}$ of the vehicle to, for example, a value $z_{abheb} - \Delta z$ which is smaller than the critical deceleration value $z_{abheb}$. Alternatively, the brake pressure at the rear axle HA could be set to smaller values than those predefined after the differential slip control process even before the maximum deceleration $z_{max}$ has been reached, and the front axle pressure could be correspondingly increased, as shown in FIG. 3. This has the advantage that the lateral guidance of the rear axle HA is improved further. Since the front axle VA is still far from it locking limit owing to the high dynamic axle load displacement, this leads to a more neutral driving behavior.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. In a method for brake pressure distribution between axles of a vehicle having a pressure medium brake, the vehicle including rotational speed sensors assigned to brakeable wheels and providing actual wheel speed signals, wherein the brake pressure distribution between axles is regulated as a function of a difference in wheel rotational speeds between axles or wheel slip values between axles at the axles and an exceeding of a predefined limit value by the difference serves for the brake pressure distribution regulation, the method comprising:

determining a brake pressure at the rear axle and determining a deceleration of the vehicle at first and second service braking operations of the vehicle;

interpolating or extrapolating based on a dependency between the brake pressure at the rear axle and the deceleration of the vehicle after at least the first and second service braking operations to acquire a critical deceleration value at which at least the brake pressure at the rear axle would become lower than a predefined brake pressure limiting value.

2. The method as claimed in claim 1, wherein the predefined brake pressure limiting value for the rear axle is equal to zero or corresponds to an application pressure of brakes of the rear axle.

3. The method as claimed in claim 1, wherein the predefined brake pressure limiting value for the difference in wheel speeds between the axles or in wheel slip values between the axles is equal to zero.

4. The method as claimed in claim 2, wherein the predefined brake pressure limiting value for the difference in wheel speeds between the axles or in wheel slip values between the axles is equal to zero.

5. The method as claimed in claim 1, wherein maximum deceleration of the vehicle during a braking operation is limited to a value which is smaller than the critical deceleration value.

6. The method as claimed in claim 2, wherein maximum deceleration of the vehicle during a braking operation is limited to a value which is smaller than the critical deceleration value.

7. The method as claimed in claim 3, wherein maximum deceleration of the vehicle during a braking operation is limited to a value which is smaller than the critical deceleration value.

8. The method as claimed in claim 5, wherein the brake pressure at the rear axle is set to smaller values than those predefined after the differential slip control process even before reaching the maximum deceleration.

9. A method for brake pressure distribution between axles of a vehicle having a pressure medium brake, the method comprising:

determining a dependence between at least a brake pressure at a rear axle and a deceleration of the vehicle after at least two preceding service braking operations of the vehicle;

acquiring a critical deceleration value at which at least the brake pressure at the rear axle would become lower than a predefinable brake pressure limiting value by interpolating or extrapolating from a determined dependence between the brake pressure and the deceleration; and controlling a brake force distribution utilizing the critical deceleration value.

10. The method as claimed in claim 9, wherein the critical deceleration value for the rear axle is equal to zero or corresponds to an application pressure of brakes of the rear axle.

* * * * *